United States Patent Office 2,771,953
Patented Nov. 27, 1956

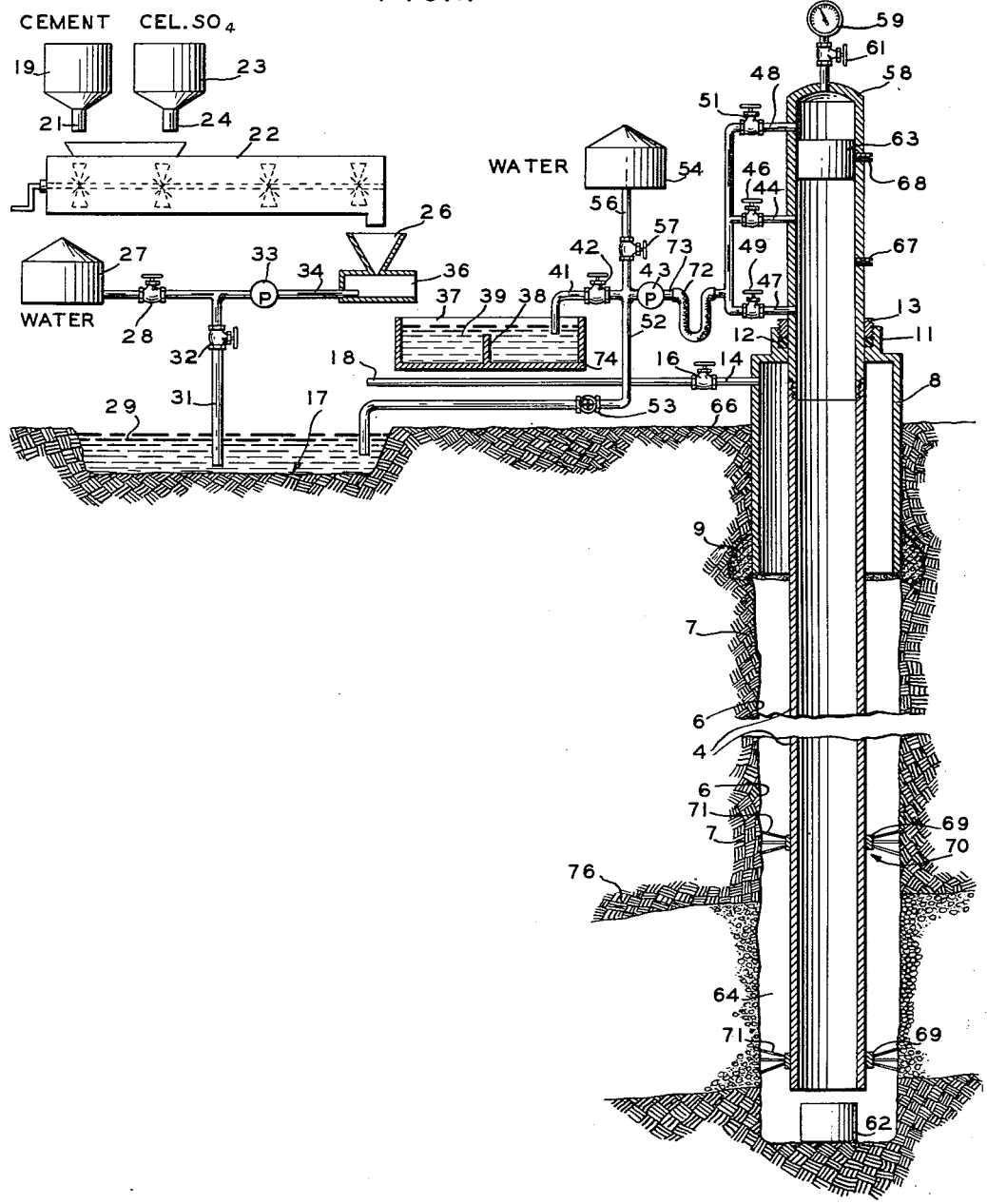

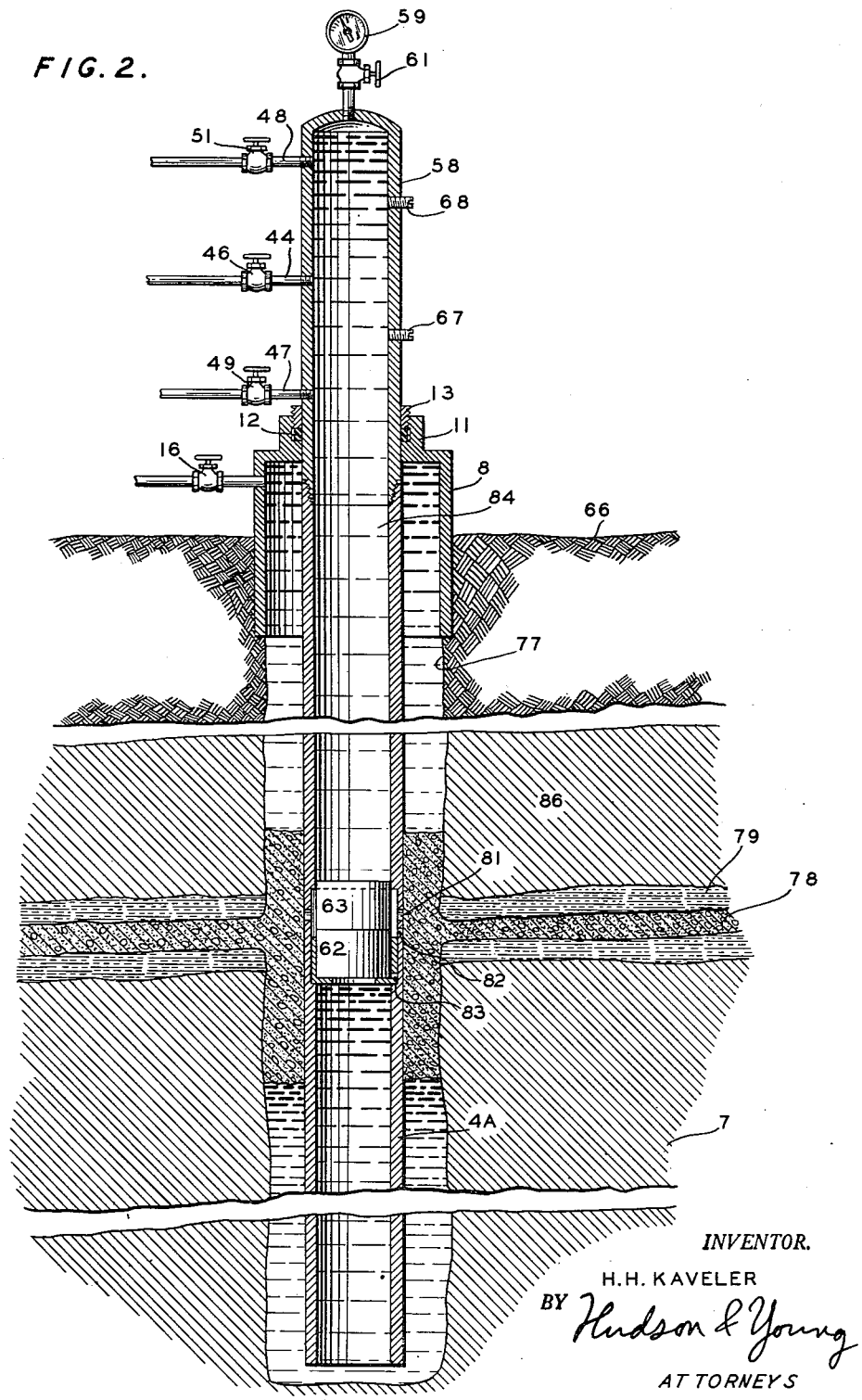

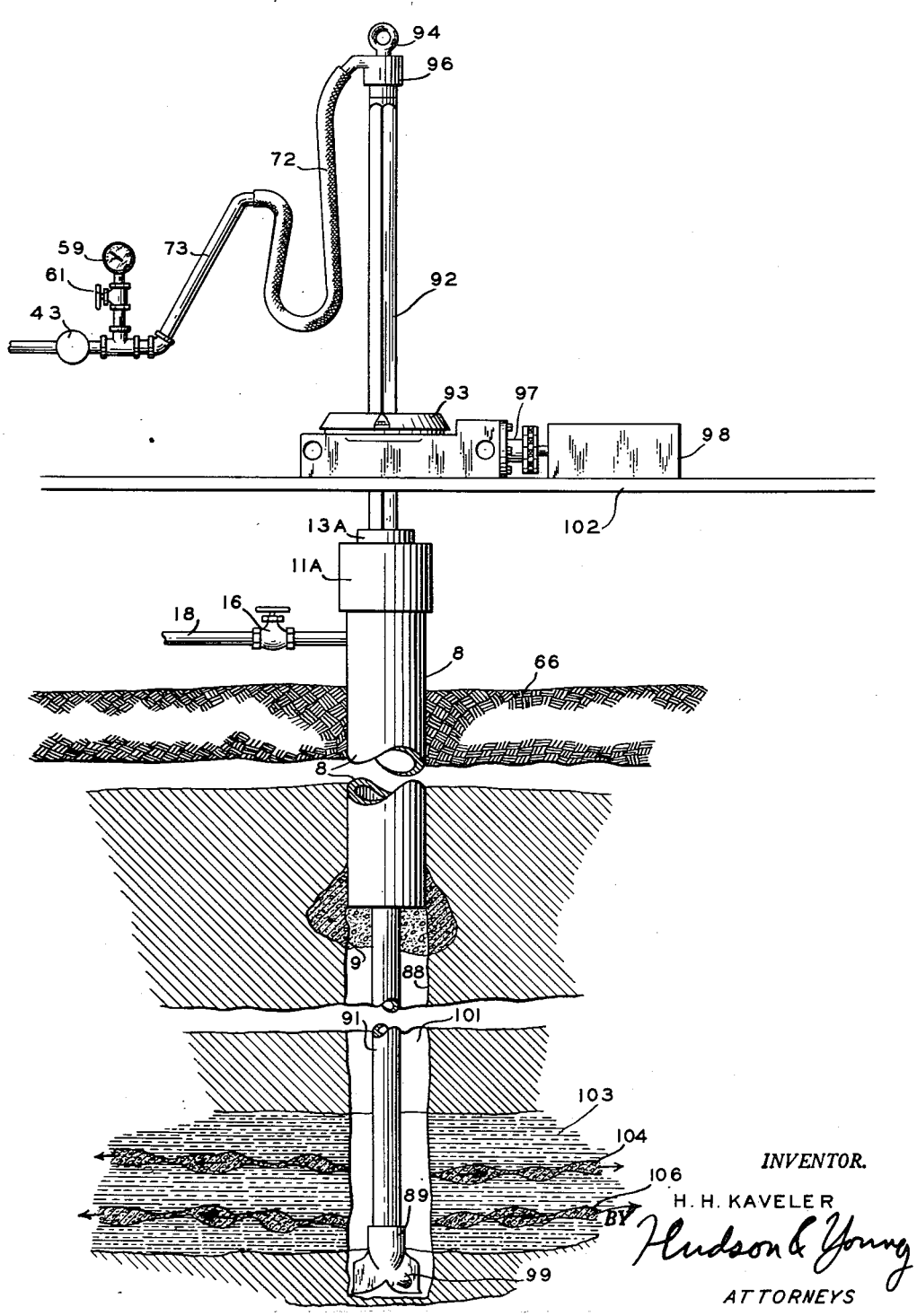

2,771,953
HYDRAULIC CEMENTS HAVING AN EXTENDED THICKENING TIME, METHODS OF MAKING THE SAME, AND PROCESSES EMPLOYING THE SAME

Herman H. Kaveler, Bartlesville, Okla., assignor to Phillips Petroleum Company, a corporation of Delaware Application May 5, 1952, Serial No. 286,131

11 Claims. (Cl. 166—31)

This invention relates to cements having retarded rates of hydration or set, to slurries of such cement, and to the method of making these slurries. The cement with which the invention is concerned is preferably a Portland or Portland-type cement. In another aspect it relates to any hydraulic cement composition in a dry form, or with added water in an aqueous slurry form, which when in the form of an aqueous slurry has a retarded initial set or extended or retarded thickening time and/or a reduced water-loss to adjacent porous formations, due to the addition of a minor but effective amount of acid cellulose sulfate or a salt of said acid cellulose sulfate, this invention relating first to said compositions of matter, second to processes of compounding said compositions, and third to processes for using said compositions in the arts of cementing wells, sealing porous formations during the drilling of wells, cementing casings in the well, squeeze cementing, plugging the well or the earth formation adjacent the same, and grouting or sealing crevices, cracks or holes in man-made formations, such as buildings, foundations, dams, breakwaters or concrete and masonry structures, in some instances the cracks or fractures already existing before the slurry is pumped into them, and in some cases the pressure of the slurry being pumped into or against the surface of said formation or structure forming by its pressure the cracks or fractures to be filled.

The present application is a continuation-in-part of my copending U. S. patent application Serial No. 47,555 of Herman H. Kaveler, filed September 2, 1948, abandoned March 12, 1953, for "Retarded Cement and Method of Making."

Among the objects of the invention is the provision of a cement having a retarded rate of hydration, or retarded set, as it will be hereinafter termed, particularly at elevated temperatures up to and above 300° F. and/or at high pressures up to and above 20,000 pounds per square inch, such as are encountered in cementing of deep wells.

One object of the present invention is to provide a suitable hydraulic cement aqueous slurry, and suitable processes employing the same, for cementing casing in wells, for squeeze cementing in wells, and for grouting cracks, fractures or voids, in natural formations, such as in wells, or in man-made formations such as dams, breakwaters, walls and massive foundations and structures of all types.

Another object of this invention is to provide a dry hydraulic cement powder which is a novel composition of matter, and which may be mixed with water to form an aqueous cement slurry which is a novel composition of matter and which has at least one of the following useful properties; a relatively retarded time of initial set, a relatively extended thickening time during which it is pumpable, and/or a relatively low water-loss to porous formations with which it may come in contact during cementing or grouting operations.

Further objects of the invention reside in the provision of a slurry of the above cement, and in a method of making such slurry.

These and further objects of the invention will be more readily apparent in the following description.

In the cementing of oil wells it is customary to mix a hydraulic cement, for example a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it out the bottom of the casing and upward around the outer surface of the casing, or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within a reasonable time, say within a few days. It would be even more desirable to have it attain its final set in about 24 hours but often this is not attainable.

As pointed out in the preceding paragraph, the most important function of the hydraulic cement aqueous slurry of the present invention is that it has a retarded time of initial set, and therefore remains pumpable for a relatively long period of time and a relatively long period of time passes before it thickens, yet it will attain a final set of some considerable strength within a reasonable length of time so that the well-drilling crew is not unduly delayed, but can get back to work and proceed to continue drilling the well bore, or to perforate the casing and/or cement with the usual gun perforating tools known to the art. All types of acid cellulose sulfate and all salts of all types of acid cellulose sulfate have sufficient set retarding and thickening time extending properties to be used commercially in the practice of the present invention, and when the acid cellulose sulfate or salt of cellulose sulfate is carefully prepared so that a relatively high degree of sulfate substitution has occurred with relatively low amounts of degradation of the cellulose molecules, a secondary effect is achieved, which, while not as important as the first mentioned effect of delaying the time of initial set and extending the thickening time of the cement, is also of considerable value in cementing oil wells, namely, the aqueous cement slurry containing the minor but effective amount of acid cellulose sulfate or salt of acid cellulose sulfate has a reduced tendency to lose water to porous formations across the surface of which it must pass in going to its intended position in the well. Many failures in prior art oil well cementing jobs, which have been accredited to the premature setting of the cement, are thought to be caused actually by the formation dehydrating the cement slurry, thereby rendering the cement immobile before it reaches the desired position. As the practice of using scrapers to clean the mud off the well walls to obtain a better cement-formation bond becomes more frequently used, the better the formations will absorb water from the cement slurry causing it not only to plug the annulus between the casing and the wall of the well, but also to have insufficient water for normal hydration upon setting, and the greater will become the realization of the need for low water-loss cements.

Everything which is said applying to natural formations in wells applies also in some degree to man-made formations being grouted, and the word "formation" as used herein is regarded as generic to natural earth formations, geological formations, and man-made formations such as structures.

In the prior art of squeeze cementing in wells and in forcing grout into the cracks and crevices in fractured foundations or the like, it has been the practice to employ as a breakdown agent, water or drilling mud, which is forced ahead of the aqueous hydraulic cement slurry into the formation to split the same and enlarge the fractures or cracks to be filled, because if ordinary hydraulic cement aqueous slurry were employed it would lose water to the formation or foundation so rapidly that the cement slurry would start to set before much penetration has been effected. When a relatively low water-loss hydraulic cement aqueous slurry is employed, the amount of breakdown agent can be greatly reduced, or entirely eliminated, because the low water-loss cement slurry will penetrate to much greater distances before losing sufficient water to be caused to set by this dehydration. When squeeze cementing in oil wells is involved, in which it is desired to force a thin disk or layer of these cement slurries out into a natural earth formation along pre-existing or pressure-made fractures, in order to separate an oil sand from some other sand at the general vicinity where the oil well intersects the same, it is especially advantageous to use a relatively low water-loss cement slurry as breakdown agent because then less water is likely to be absorbed by the oil formation where it might cause a reduction in the present or future amount of production of oil. Some oil-bearing formations contain bentonitic materials which swell when they encounter water, and if excess water is injected into such formations, the swelling of the bentonitic material may prevent future production of oil.

In the drawings:

Figure 1 is an elevational view with parts in section of apparatus suitable to carry out the processes of the present invention in compounding the hydraulic cement aqueous slurry and cementing a casing in a well, or grouting a formation.

Figure 2 is a cross sectional view of a portion of a well in which squeeze cementing is being employed to place a cementitious horizontal dam out into the surrounding formation.

Figure 3 is a cross sectional view of a portion of a well in which a porous formation is plugged to prevent loss of circulation while drilling.

Figure 1 illustrates some of the processes devised by the present invention for cementing a casing 4 in a well 6 drilled in formation 7, or for grouting cracks or crevices in formation 7, it being understood that formation 7, instead of being a natural geological formation, may be a man-made formation such as a foundation, dam, breakwater, or other concrete or masonry structure. While casing 4 could be placed in the open bore 6 of the well, and the circulated drilling mud, hydraulic cement aqueous slurry, or other fluids in the bore 6 could be allowed to emerge around pipe 4 onto the surface of the formation 7 from the uncased bore 6, it is preferred to have at least one casing, soil pipe, or other pipe 8 secured in sealing contact with formation 7, either by close fit or by previous cementing 9. The pipe 8 is provided with a casing head 11 having a stuffing box or packing 12 forced into sealing contact with casing 4 by some sort of follower 13. Casing head 11 also is provided with an outlet pipe 14 which is preferably controlled by a valve 16 and which may discharge into a mud pit generally designated as 17 through pipe 18.

A suitable amount of a suitable grade of hydraulic cement, such as Portland cement, is fed from bin 19 through valve 21 into mixer 22 and a minor but effective amount of an additive selected from the group consisting of acid cellulose sulfate and salts of acid cellulose sulfate, for example, sodium cellulose sulfate, say from 0.05 to 5 percent by weight of the dry hydraulic cement, for example, 0.5 percent by weight, is also fed into mixer 22 from the bin 23 controlled by valve 24. Of course this mixing in mixer 22 need not occur anywhere near the well, but could have taken place any number of miles away and several months before, and then the ready-mixed cement composition brought to the well in sacks (not shown) or in a bulk cement truck (not shown). In any event the dry cement composition from mixer 22, or from cement sacks (not shown), is dumped into hopper 26 where it is picked up and mixed with a jet of water from tank 27 controlled by valve 28, or with a jet of drilling mud 29 from mud pit 17 through pipe 31 controlled by valve 32, the selected liquid being forced by pump 33 through jet pipe 34. The jet of liquid from 34 picks up and mixes with the dry cement from hopper 26 and discharges the same out opening 36, which could connect directly to casing 4. To insure thorough mixing, allow for inspection, and act as a surge reservoir, a suitable reservoir 37 is generally provided and I have found it useful to have a baffle in the same, over which the hydraulic cement aqueous slurry flows, and is then picked up by pipe 41 controlled by valve 42 from which it may be pumped by pump 43 into casing 4 through pipe 44 controlled by valve 46. Pipes 47 and 48 controlled by valves 49 and 51 respectively, are both reserved for drilling mud 29 from mud pit 17, drawn through pipe 52 controlled by valves 53 when desired, or water from tank 54 drawn through pipe 56 controlled by valve 57 when desired.

Casing 4 obviously generally consists of a number of pipes screwed together to form a single pipe and at its upper end it is provided with some type of casing head 58. While not essential, it is useful to have a pressure gauge 59 connected at some point in the system. The pressure gauge can be cut off by valve 61.

While casing 4 could be cemented without the use of plugs 62 and 63 simply by opening valves 16, 42 and 49, and pumping the hydraulic cement aqueous slurry with pump 43 down inside of casing 4, out the end thereof and up around the anular space 64 between bore 6 and casing 4 on to the ground surface 66 around casing 4 (if no soil pipe 8 is employed) this would not produce the best type of cementing available as the interior of the casing 4 would be full of cement which would have to be drilled out, and no pump pressure could be placed on the slurry. Whether soil pipe 8 is present for pressure control or not, it is possible, when desired in the process, to close valve 42 and open either valve 53 or 57 and follow the cement with water 54 or drilling mud 29, and by counting the strokes of the pump and stopping the same and closing valve 49 at the proper time to stop the cement water interface before the drilling mud or water comes out the bottom of casing 4, and thus cement without plugs 62 and 63 and still have casing 4 almost free of cement. By providing soil pipe 8, casing head 11, flow line 18, valve 16 and casing head 58, it is easy to place pressure on the slurry by throttling or closing valve 16 when desired.

The two plug method illustrated, however, is preferred. Starting with plug 62 secured in casing head 58 between pipes 44 and 47 by set screws 67 and plug 63 held as shown with set screws 68 and all of valves 42, 53, 57, 51, 46, 49 and 16 closed, it is usual to first wash the annular space 64 of well bore 6 with either drilling mud 29 or water 54, in most cases drilling mud 29 being preferred, and to do so valve 53 or 57 is opened, depending on whether drilling mud 29 or water is used, valve 16 is opened and valve 49 is opened and pump 43 is started, pumping the drilling mud (or water) through casing 4 up through annular space 64 and out through pipe 18. At the same time casing 4 may be moved up and down through stuffing box 11, packing 12 being loosened by loosening follower 13, and casing 4 may, if desired, have secured thereto wall scraper elements generally designated as 70 which may comprise annular rings 69 secured to casing 4, mounting more or less radial wire bristles, rods or strips 71 which scrape the drilling mud cake off the walls of well bore 6 in order to provide a good bond between the formation 7, the well, and casing 4. Any number of scrapers 69 may be provided and the movement of casing 4 may be great enough so that the scraping of one set of scrapers 69 will overlap the scraping of the next adjacent set, and to allow this movement a flexible section of pipe 72 may be provided in the line 73 from pump 43.

When the washing of the well and cleaning of the walls is sufficiently accomplished, pump 43 is stopped, and whichever of valves 53 and 57 was opened is closed. The casing 4 at that time is spaced from the bottom of the hole 6 a distance less than the length of plug 62 plus a portion of the length of plug 63 but greater than the length of plug 62. Follower 13 of stuffing box 11 is adjusted to seal at 12 around casing 4. Valves 16, 42 and 46 are open and set screw 67 is screwed away, releasing plug 62, and pump 43 is started, pumping hydraulic cement aqueous slurry from sump 74 of reservoir 37 into the space between plugs 62 and 63, forcing plug 62 down casing 4 and out the end thereof into the position shown. The cement forces the plug out the end of casing 4 and proceeds up the annulus 64 forcing the mud or water ahead of it up annulus 64 and in doing so it may have to traverse an especially porous formation 76 which will take the water away from the aqueous slurry in the absence of the sodium cellulose sulfate 23, especially if the drilling mud has been scraped from the surface of formation 76 by the scrapers 71. When the hydraulic cement aqueous slurry commences emerging from pipe 18, or when it is believed that it would emerge from pipe 18 or would reach the desired elevation in annulus 64 as soon as casing 4 were cleared of cement, depending on the type of cementing job desired, then valve 51 and one of valves 53 or 57 are opened, set screw 68 is loosened, and valves 42 and 46 are closed, whereupon the water (or drilling mud) passes through pipe 48 into casing head 58, moving plug 63 down the casing 4 until plug 63 rests on top of plug 62 but is unable to come out of the bottom of the casing and therefore plugs the end of casing 4, whereupon the pressure (as indicated by gauge 59) goes up as an indication of what has happened, valve 51 is closed and pump 43 shut down, leaving the annular space 64 full of cement and the inside of casing 4 full of water or drilling mud.

Any time during the entire pumping process from the time the cement reaches 76 until plug 63 seats on plug 62 that it is desired to drive the hydraulic cement aqueous slurry into the more porous portions of the formation, such as formation 76, it is only necessary to throttle pipe 18 by partially closing valve 16, or, if desired, to close valve 16 completely for the desired time, which action will send up the pressure in the system to the desired degree and force cement slurry into formation 76 if it will take the same at that pressure.

The U. S. patents now in Class 166, Wells, Subclass 22, Cementing or Plugging, disclose a number of other suitable cementing processes which may be employed in my invention.

Figure 2 is illustrative of a well 77 similar to well 6 and equipped with similar equipment in which a squeeze-cementing job is employed to place a cementitious horizontal dam 78 out into the surrounding formation 79. As will be noted by the use of similar numbers, the equipment at the top of the well is all the same as in Figure 1 and is operated in the same manner. Casing 4A differs from casing 4 somewhat, in that the intermediate portion of casing 4A is provided with a number of radial holes 81 which holes are at first covered by sleeve 83 held in place by frangible pin 82. When plug 62 comes down the casing 4A ahead of the cement it catches in sleeve 83, breaks frangible pin 82 and opens openings 81 to cement. This causes a jump of the indicator needle of gauge 59 and at that time valve 16 can be closed for as long a period of time as desired so that cement 78 can be forced away out into formation 79. When plug 63, which is followed by liquid 84 which may be water 54 or drilling mud 29, reaches the top of plug 62 it plugs the interior of casing 4A, closing the holes 81. Incidentally, in both Figures 1 and 2, plugs 62 and 63 are made of wood, or some easily drillable plastic composition, and preferably sleeve 83 is made of some drillable material, such as aluminum or magnesium, so that after cement dike 78 has set, the casing 4A can be drilled out to its original diameter and drilling or other desired operations carried out through the same.

In Figure 2 the formation 86 and 87 may be more impervious than formation 79, and the crack into which cement 78 is forced may have originally been formed by the pressure on the aqueous slurry of pump 43 with valve 16 closed, in which case formation 86 and all overlying formations are raised or compressed enough to make room for cement 78. These formations 86, 87 and 79 may all be man-made, such as layers of earth, concrete or masonry, as in a big dam or other foundation.

In Figure 3 is illustrated rotary drilling operations in which a well 88 is being drilled with a fishtail bit 89 rotated at the end of a drill string 91. Drill string 91 has a square section 92 known as a kelly which is slidably and rotatably engaged with a square hole or bushing in rotary table 93, the drill bit being supported from eye 94 of rotary swivel 96 by means of a hoisting tackle (not shown) and rotary table 93 is rotated through gear 97 driven by motor 98. At the same time pump 43 is pumping drilling mud 29 (see Figure 1) through pipe 73, flexible section 72 and rotary swivel 96 down the inside of kelly 92 and drill string 91 and out of the jet hole of bit 89, returning through annular space 101 through soil pipe 8, valve 16 and pipe 18 into mud pit 17. Soil pipe 8 is provided with a stuffing box 11A, which because the kelly is square has to have a rotatable portion 13A slidably packing against the square sides of kelly 92. Such equipment is well known in the art of drilling wells, as shown by U. S. patents in Class 166, Wells, Subclass 15, Controllers; and Class 255, Earth Boring, Subclass 19A, Rotary, Blowout Preventers.

Motor 98 and rotary table 93 are supported by floor 102 of the usual rotary well drilling rig, the remainder of which drilling rig is not shown but is well known to those skilled in the art.

When rotary drilling, sometimes a cavernous formation 103 is encountered, containing passages 104 and 106, which may have an apparently unlimited capacity for taking up drilling mud in the direction shown by the arrows. When such a formation is encountered, instead of directing ordinary drilling mud 29 in through pipe 52 and pumping the same down drill string 91 with pump 43, valve 53 is closed (see Figure 1) and valve 32 is opened, pump 33 is started, valve 28 being closed, and drilling mud is jetted through 34 and mixed with hydraulic cement containing acid cellulose sulfate or a salt of the same, which is discharged as an hydraulic cement aqueous mud containing slurry into 39 from which it is picked up by pipe 41, valve 42 being open, and valves 53 and 57 closed, by pump 43 and pumped down drill string 91. At this time valve 16 may be closed to increase the pressure forcing the slurry back into caverns 104 and 106, but closing valve 16 may be unnecessary if caverns 104 and 106 are already taking the drilling mud completely. Whenever the operator, because of rising pressure or the returning of slurries through pipe 18, decides that caverns 104 and 106 are shut off and circulation has been restored, valve 42 is closed and valve 53 is opened, valve 16 now being opened, and the rotary drilling continues in the usual manner with drilling mud 29 from mud pit 17 washing the remains of the cement containing mud out of bore 101 and pipe 18. Obviously the pump 33 is shut down as soon as slurry 39 is no longer needed, and pipe 18 can be deflected to another mud pit or dumping place (not shown) to avoid the cementitious mud returning to mud pit 17, until cement free mud returns, and then it can be deflected back to mud pit 17. These formations being drilled may be man-made as in a dam, or may be natural formations encountered as in oil well drilling.

By hydraulic cement this invention intends to include all mixtures of lime, silica, and alumina, or of lime and magnesia, silica and alumina and iron oxide (magnesia for example may replace part of the lime, and iron oxide a part of the alumina), as are commonly known as hydraulic cements. Hydraulic cements include hydraulic limes, grappier cements, puzzolan cements, natural cements and Portland cements. Puzzolan cements include slag cements made from slaked lime and granulated blast furnace slag. Because of its superior strength Portland cement is preferred among the hydraulic cements, but as the art of cements recognizes hydraulic cements as a definite class, and as results of value may be obtained with acid cellulose sulfate, or salts of cellulose sulfate, with any member of that class, it is desired to claim all hydraulic cements. In addition to the ordinary construction grades of Portland cement or other hydraulic cements, modified hydraulic cements and Portland cements designated as high-early-strength cement, heat-resistant cement, and slow-setting cement may be used in the present invention.

In most oil well cementing and grouting operations it is generally desirable to use neat cement for added strength, but obviously it is always possible to add to the hydraulic cement, water, and acid cellulose sulfate or salt of the same, any desired amount of an inert granular filling material or aggregate such as sand, ground limestone, or any of the other well known inert or even cementitious aggregates, as long as simple tests show the amount added does not reduce the compressive strength after final set below the desired value. For example, in plugging porous formations, bentonite or other clays are often added to hydraulic cement aqueous slurries, as taught by U. S. Patent 2,041,086 of May 19, 1936, or iron oxide or barium sulfate is added to make heavy cement. Any of these aggregates can be added to the aqueous hydraulic cement slurry of the present invention in the usual proportions used in the prior art.

In operations in previously uncased wells it is often desirable to use neat cement in the practice of the present invention, because inert filling material may automatically become detached from the walls of the well, and will tend to mix with and dilute the slurry to such an extent that it is undesirable to add any filling material to the slurry being forced into the well. It is customary in the prior art when cementing to make simple tests as to time of set, compressive strength, etc., on samples of the proposed mix.

The amount of water added to the cement of the present invention is not critical, it being obvious that sufficient water should be added to form a pumpable slurry, and that when the slurry becomes pumpable no further water need be added. One advantage of the slurry of the present invention when a relatively less degenerated acid cellulose sulfate or salt of the same is used is that it is a low water-loss slurry, and therefore it is not necessary to add much excess water over the amount making the slurry pumpable as a reserve for expected losses, which excess water might tend to reduce the final compressive strength of the cement.

It has been found that all hydraulic cements, especially Portland and Portland-type cement aqueous slurries can be retarded in setting time, the time of thickening extended, and in some cases the water-loss tendencies retarded, so that they meet all the above requirements for the satisfactory cementing of deep wells and like operations by the addition of a minor but effective amount of from about 0.05 to 5% by weight of the dry hydraulic cement of acid cellulose sulfate, or the metal, ammonium or organic base, or other salts of acid cellulose sulfate, without seriously affecting the other desirable properties of the cement. It is preferred at present to use the sodium or potassium salts of acid cellulose sulfate merely because these salts are readily available commercially and therefore relatively inexpensive. However, good results will be obtained using any other alkali metal salt, such as the lithium, rubidium, caesium and other rare alkali metal salts, or the ammonium or organic base salts of acid cellulose sulfate, all of which are water soluble. Typical organic base salts that can be used are those derived from ammonia such as methyl amine, dimethyl amine and quaternary ammonium bases; also pyridine, morpholine, and the like. In addition the alkaline earth metal salts such as the barium, calcium, strontium and magnesium, and the heavy metal salts such as the aluminum, iron, copper, lead, silver, mercury, nickel, and all other salts of acid cellulose sulfate (which are probably insoluble in water but which hydrolyze in the hydraulic cement aqueous slurry which is an aqueous alkaline solution) are just as useful in this invention in the aqueous hydraulic cement slurry which is quite alkaline. Acid cellulose sulfate and all of its salts, whether such salt is formed in the aqueous hydraulic cement slurry by hydrolysis of some water-insoluble salt, are all valuable in amounts of 5 percent or less, based on weight of dry cement, in retarding the set of aqueous hydraulic cement slurry, especially at the temperature and pressure encountered in cementing a well, and in many instances the acid cellulose sulfate or salt will decrease the water loss from said aqueous hydraulic cement slurry to porous formations encountered in the well.

While 0.05 to 5% of acid cellulose sulfate or its salts by weight of the dry hydraulic cement will give valuable results, it has been found that from 0.2 to 1% is the most preferred range in wells less than 14,000 feet deep and less than 300° F., the use of 0.5% being particularly effective in such wells, and the percentage above 1% being chiefly of value in still deeper and hotter wells.

The terms acid cellulose sulfate and its salts includes all cellulose compounds which may be regarded structurally as being the cellulose monoesters of sulfuric acid and the metal, ammonium or other salts thereof. The acid cellulose sulfate esters are characterized by the typical sulfate linkage:

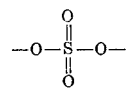

wherein S is sulfur, and O is oxygen.

It will be seen that the reaction product of cellulose and sulfuric acid or chlorosulfonic acid contains the sulfate linkage:

wherein

is an anhydroglucose unit of the cellulose molecule and $n$ is the number of such units in such cellulose molecule, the formula showing mono-substitution of each unit, which almost never occurs, as some groups may have double or even triple substitution, and many may have no substitution at all. The degree of substitution is merely the average of all the groups.

Acid cellulose sulfate and its salts may be prepared by a number of methods old in the prior art, employing either sulfur trioxide gas and the cellulose alone, or sulfuric acid and/or sulfur trioxide along with various diluents to retard the reaction with the cellulose, and no matter how the acid cellulose sulfate is made, it and any of its salts will act to retard the set of a hydraulic cement aqueous slurry and to increase the time before the cement thickens to the point where it is not pumpable, but acid cellulose sulfate and its salts made by many of the prior art methods often has little or no effect on the water-loss properties of an aqueous hydraulic cement slurry in which it is incorporated. The processes of preparing acid cellulose sulfate and its salts mentioned above in this paragraph generally will result in a product which will increase the time of thickening but have no effect on the water-loss of aqueous hydraulic cement slurries. The next following paragraph describes processes much more likely to produce decreased water-loss of such slurries.

While not to be considered as limits, a relatively high degree of sulfate substitution for the present invention is about 0.2 or more out of the 3.0 possible in each anhydroglucose unit in the cellulose molecule (which unit has 3 hydroxyl groups which can be substituted), and a relatively low amount of degradation is shown if the sodium cellulose sulfate in a 1% concentration in water has about 10 or more centipoises Stormer viscosity. This may be accomplished preferably by such processes as first outlined by Dr. Georges Frank in his Belgian Patent 448,249 filed December 5, 1942, and issued June 30, 1943, which consists of introducing dry cellulose, in the form of linters, wood pulp or wood (in the last cases, after they have been divided sufficiently to present a great surface, for example, in the form of paper, flakes, shingles, sawdust) in a cold bath conssisting of sulfuric acid and alcohol in a proportion which prevents on one hand the dissolving of the cellulose and on the other hand, however, permits the partial sulfonation thereof. The alcohols taking part in the esterification bath are chosen from the lower aliphatic alcohols, for example, methyl, ethyl, propyl, butyl, amyl and hexyl, and from higher alcohols which are completely miscible with sulfuric acid but excluding those isomers which are unstable toward this acid. The cyclic alcohols, such as cyclohexinol, can likewise be used, as well as substituted alcohols such as glycolic ethers, for example, monobutylglycol. A mixture of several alcohols, of course, is included in this invention. Finally, the use of unsaturated aliphatic alcohols is not excluded. In addition to the sulfuric esters of alcohol (or the alcohols and sulfuric acid) the presence of other substances in the esterification bath is not excluded, for example, that of other acids or aromatic substances such as benzene or others. The acid cellulose sulfate can be liberated from the major part of the acid which it still retains by washing with methyl, ethyl or another alcohol which can be identical with that used in the esterification bath. By neutralization with the appropriate base, one may obtain the stable salt of acid cellulose sulfate. The sulfate of the excess base is of course removed, but the amount remaining is not too critical for use in the present invention, as seen by comparing tests 36 and 42 to 46 in Table IV below. Further details may be found in said Belgian Patent 448,249 of June 30, 1943. The process of U. S. Patent 2,559,914 of Georges Frank, of July 10, 1951, can be used, because it is a substantial duplicate of said Belgian patent. Another suitable, and similar, process for making acid cellulose sulfate and its salts is U. S. Patent 2,539,451 of January 30, 1951, of Carl J. Malm et al. Any of the above, or similar, processes of making acid cellulose sulfate and its salts may be employed for the present invention, when it is desired to give water-loss reducing properties to the aqueous hydraulic cement slurry with which it is to be mixed.

Portland cement is a mixture of complex silicates and aluminates of calcium containing excess lime. The setting or hardening is a result of the hydration or other chemical readjustments of the various components. Generally speaking, three periods in the set are recognized: "initial," "final" and "hardening" sets. The initial set normally occurs at ordinary temperature in from one or two hours after the mixing, the final set two to five hours later and the hardening continues for an indefinite time but it is substantially complete in about 30 days.

The initial set is said to have occurred when a cement slurry has lost its plasticity to such a degree that the two pieces of a broken specimen will not unite to form a homogeneous mass when placed in close contact. The individual grains of a cement slurry must remain undisturbed in intimate contact with each other for a time before the initial set occurs in order to produce a coherent mass. Agitation during the latter part of the period of initial set will prevent the cement from hardening properly to the desired homogeneous, coherent mass.

In order to form a perfect seal in cementing wells, it is necessary that the cement be placed before the initial set occurs and it is desirable that it be placed and allowed to stand for a short period before the initial set begins. With the equipment available, there is a limit to the time in which it is possible to mix a cement and pump it into the bottom of the well and up around the casing to the location desired.

Another reason it is necessary to have the cement in place before the initial set begins is that the viscosity rises as the setting progresses. This increases the difficulty of pumping and is undesirable because of the added strain on the pumping equipment.

It is possible to retard the rate of set, within narrow limits, by increasing the alumina content of the cement, but this method is not widely used because of the high cost of high alumina cements and the limited effective range. The rate of set can be retarded also by increasing the amount of water present in the mix. However, above about 35 to 50 percent water, based on the weight of dry cement, increased amounts of water will result in weaker cement and there is no way of knowing exactly how much dilution will result from water encountered in the well. Addition of small amounts of gypsum, or calcium sulfate will result in a retarded rate of set, but an excess will increase the rate and may cause the cement to disintegrate or be weakened. It is therefore, highly desirable that a retarded cement such as mine be available for cementing work.

The most convenient method of using acid cellulose sulfate or its salts in cement is to run the same and the hydraulic cement through a rotary mixer to produce intimate mixing and later add water to form a fluid slurry. However, the acid cellulose sulfate or its salts may be added directly to the cement and water at the time of mixing at the well, or the acid cellulose sulfate or its salts may be dissolved in the water with which the cement is mixed, with substantially the same result. The method of mixing is not critical as long as a somewhat uniform mixture is produced.

The rate of hydration or set of cement is ordinarily increased by an increase in temperature. Since the bottom hole temperature in the well may be considerably higher than the atmospheric temperature, it is desirable that a method such as I have described be available for use in the cementing of oil wells. My method is effective at elevated temperatures as well as at ordinary atmospheric temperatures, because obviously a set retarding agent operative at atmospheric temperatures will also retard the set at higher temperatures.

While it is not desired to limit the present invention by any theory of operation and while the scope and validity of the claims do not depend upon the validity of any theory of operation, it is believed helpful in understanding the invention to think of the acid cellulose sulfate or its salts temporarily absorbing so much of the water that the Portland cement is only slowly able to obtain enough water to make its initial set, whereby the initial set of the cement is greatly retarded. Finally the Portland cement particles take the water away from the water soluble cellulose particles and attain an initial and then a final set with suitable strength in the cement for use in oil well cementing operations.

The prior art United States Patent 2,427,683 of September 23, 1947, to Norman C. Ludwig for "Retarded Cement and Method of Making" teaches that the setting time of an aqueous slurry of hydraulic cement (such as Portland cement and water) used in cementing a well can be retarded for about three hours by adding from 0.5 to 0.75 percent by weight of the dry cement of at least one of the group consisting of carboxymethylcellulose and salts of carboxymethylcellulose and/or hydroxyethylcellulose; acid carboxymethylcellulose, the sodium salts of the same, the alkali metal salts, the ammonium salts and the other metal salts such as the alumina, iron, copper, lead, silver, mercury, nickel and similar salts of carboxymethylcellulose, can all be used because those which are not soluble in water will hydrolize and become soluble in the hydraulic cement slurry which is always an alkaline aqueous slurry.

The materials suggested by said Ludwig patent are cellulose ethers, and no cellulose esters are mentioned because none were known that would be suitable.

The present invention consists in the discovery that in the class of cellulose esters, which as a class are of no value whatsoever in retarding the set of aqueous hydraulic cement slurries, that acid cellulose sulfate or any salt thereof, in a quantity less than 5 percent by weight of the dry cement, will retard the set of an aqueous slurry comprising a mixture of hydraulic cement and water to a much greater extent than any of the cellulose ethers and any other cellulose ester, and at the same time, in most instances, will reduce the water-loss of the slurry to porous formations encountered in the well much more effectively than any cellulose ether or any other cellulose ester.

EXAMPLE I

A neat Portland cement aqueous slurry having a density of 14 pounds per gallon was tested without any additive, and with 1% and 0.1% respectively of the weight of the dry cement of potassium cellulose sulfate (abbreviated K Cel.SO$_4$ in Table I below). To furnish a comparison a similar 1% of sodium carboxymethylcellulose (Na CMC) in the same slurry is also reported. The first, second and fourth of these tests were first reported to the U. S. Patent Office in my application Serial No. 47,555 filed September 2, 1948, in Table II thereof.

*Table I*

| Test No. | Additive | Percent wt. of dry cement | Viscosity of Slurry | Setting time, Hours | Compressive Strength, p. s. i. |
|---|---|---|---|---|---|
| 1 | 0 | 0 | fluid | 4.4 | 1,856 |
| 2 | K Cel.SO$_4$ | 1 | do | >32 | 1,520 |
| 3 | K Cel.SO$_4$ | 0.1 | do | 7.5 | 1,665 |
| 4 | Na CMC | 1 | Very viscous | 9.8 | 767 |
| 5 | Na CMC | 0.25 | viscous | 4.8 | 1,588 |

These tests appeared so favorable to potassium cellulose sulfate that more extensive tests were made, of which the following are representative:

First, some of the exact same samples of additives and the same brand of Portland cement used in Table I were mixed up in 15 pounds per gallon aqueous slurries and tested for water-loss according to the procedure set forth in API Code 29 for drilling muds. This test measures the cubic centimeters of filtrate that can be forced through a standard filter paper in 30 minutes by a 100 pounds per square inch gauge pressure differential, which has been found to give a very good indication of what would be lost to an exposed porous sand formation in an oil well, whether from the well drilling mud or from cement being placed in the well. The results are given in Table II:

*Table II*

| Test No. | Additive | Percent wt. of dry cement | Water Loss Value, Cc./min. at 100 p. s. i. |
|---|---|---|---|
| 6 | none | 0 | 105 cc. in 1 min. 15 sec. |
| 7 | K Cel.SO$_4$ | 1 | 11.4 cc. in 30 min. |
| 8 | Na CMC | 1 | 88 cc. in 2 min. 50 sec. |

Obviously the potassium cellulose sulfate ester is much more effective than the sodium carboxymethylcellulose in Table II in reducing the excessive water loss of the Portland cement slurry alone. The neat Portland cement slurry lost all of its available water in one minute and fifteen seconds, becoming immediately unpumpable, and the slurry with the Na CMC in it reached the same unpumpable state in about three minutes, but that with the K Cel.SO$_4$ was just as pumpable at the end of 30 minutes of exposure to water-loss as it was at the start, except that it was 30 minutes further along in the process of taking an initial set in 32 hours or so. This would give a tremendous advantage in placing cement in back of casing in a well where it had to be pumped upwards through a narrow annular space past a considerable area of exposed porous sand or rock formations, and would insure placing the cement (by pumping) much further up along the outside of the casing than could otherwise be done, resulting in sealing off more extensive formations and making a better and more extensive bond between the casing and the well hole formations than ever possible before.

EXAMPLE II

The substantial equivalence of the various salts of acid cellulose sulfate is demonstrated by the following tests in Table III. A representative hydraulic cement was mixed with water to form an aqueous slurry weighing 14 pounds per gallon and tested with and without the additives listed for water loss under API Code 29 as set forth above both initially and after 1, 2 and 3 hours at 180° F. to show how high temperature in a well would effect it, the time of thickening was tested according to API Code 32 to determine how long it took the slurry to attain a viscosity of 100 poises as it set, this figure being chosen because slurry over 100 poises viscosity is getting difficult to pump into a well, and of course the compressive strength in pounds per square inch was measured at 180° F. at 1, 4, 5 and 7 days after it set, all as reported in Table III.

*Table III*

TESTS ON AQUEOUS HYDRAULIC CEMENT SLURRY DESCRIBED IN PRECEDING PARAGRAPH

| Test No. | Additive | Amount of Additive (percent by wt. of dry cement) | Water Loss (ml./min. at 180° F.) | | | | Thickening Time, Hr.: Min. to reach 100 poises | Compressive Strength | |
|---|---|---|---|---|---|---|---|---|---|
| | | | Initial | After 1 hr. | After 2 hr. | After 3 hr. | | P. s. i. after 7 da. at 180° F. | P. s. i. after X da. at 180° F. |
| 9 | None | 0 | 51/0.2 | 50/0.2 | 49/0.2 | 48/0.2 | 1:25 | 2,850 | 2,740—1 da. |
| 10 | Acid Cellulose Sulfate | 0.5 | 9.5/30 | 13/30 | 18.5/30 | | 116:28 | 2,478 | 1,530—5 da. |
| 11 | Sodium Cellulose Sulfate | 0.5 | 10.5/30 | 20.5/30 | 16.5/30 | | 90:04 | 2,638 | 2,340—4 da. |
| 12 | Calcium Cellulose Sulfate | 0.5 | 10/30 | 13/30 | 14/30 | 12/30 | 90:15 | 1,773 | 1,944—4 da. |
| 13 | Ammonium Cellulose Sulfate | 0.5 | 9.5/30 | 11/30 | 11.5/30 | 11.5/30 | 92:41 | 1,745 | 1,594—4 da. |

Table III clearly shows the outstanding retardation of setting time and reduction of water loss under deep well temperature conditions given by 0.5% by weight of the dry cement of acid cellulose sulfate and various salts thereof to an aqueous hydraulic cement slurry, all with the retention of sufficient compressive strength to be useful in well cementing.

EXAMPLE III

The equivalence of the various hydraulic cements is demonstrated by the following tests in Table IV. By this time it was evident that acid cellulose sulfate and its salts was going to be used in commercial well cementing operations, so special equipment for testing under the heat and pressure of deep wells was purchased and employed in these and later tests.

In using this equipment it became apparent that the retarded set, or etxended thickening time, was best measured by the Halliburton "thickening time" by which is meant the time at which the setting cement slurry reaches a calibrated 100 poises of viscosity, which viscosity is approaching about the limit in increasing viscosity that is readily handled by pumps through some thousands of feet of casing and well bore outside the casing in a well.

Baroid filter presses operated at 100 pounds per square inch were used to determine the water-losses of cement slurries.

Thickening times of cement slurries were measured at atmospheric pressure with a Halliburton consistometer.

A "Stanolind Pressure Thickening Time Tester" (Super Pressure Consistometer) was used to determine thickening times of cement slurries at high temperatures and high pressures. This instrument was designed to develop high pressures and high temperatures, and thus simulate conditions in an oil well where the cement is to be placed.

Some additional properties of the sodium cellulose sulfate of tests Nos. 44, 45 and 46 are reported below in Table IV(A).

Table IV(A)

SOLUTIONS OF SODIUM CELLULOSE IN WATER

| Test No. | Degree of $SO_4$ Substitution | $Na_2SO_4$ Content, Percent | Moisture Content, Percent | Stormer Initial | Viscosity 1% Conc. Aged 1 hr. at 180° F. and 24 hrs. at 70° F. |
|---|---|---|---|---|---|
| 44 | 0.25 | 8 | 9.72 | 58.5 | 50.5 |
| 45 | 0.23 | 2 | 6.33 | 105 | 121 |
| 46 | 0.27 | 1.6 | 5.92 | 69.5 | 60.5 |

The water-losses of the cement slurries were determined by the procedure specified for use on drilling fluids by API Code 29 (1942). The treatment of the cement slurry preceding the water-loss determination consisted of mixing the water and cement for three minutes to form the slurry and then storing the slurry in sealed jars in an oven at 180° F.

Thickening times of cement slurries were measured at atmospheric pressure in a Halliburton consistometer according to the procedure described in API Code 32, Section XII, paragraphs 54 and 67 (1947). Throughout the remainder of this report "thickening time" will refer to a Halliburton consistometer (atmospheric pressure) thickening time unless otherwise specified.

A "Stanolind Pressure Thickening Time Tester" was used to determine thickening times of cement slurries under high pressure. In this apparatus the cement slurry is held in a rotating cup and stirred by a paddle which is held stationary by a calibrated spring. The distortion of

Table IV

| Test No. | Hydraulic Cement Type [2] | Sodium Cellulose Sulfate (Percent of Cement) | Thickening Time (hours) | Water-Loss in ml./min. (after hours listed at 180° F.) | | | | | | |
|---|---|---|---|---|---|---|---|---|---|---|
| | | | | 1 | 2 | 3 | 4 | 5 | 6 | 7 |
| 14 | Portland | 0 | 1.0 | >45/0.4 | ([1]) | — | — | — | — | — |
| 15 | do | 0.1 | 1.9 | 47/0.2 | — | — | — | — | — | — |
| 16 | do | 0.2 | 3.9 | 50/0.4 | — | — | — | — | — | — |
| 17 | do | 0.3 | 13.6 | 21/30 | 24/0.5 | — | — | — | — | — |
| 18 | do | 0.4 | 21.6 | 12.5/30 | 12/30 | 25/1.0 | — | — | — | — |
| 19 | do | 0.5 | 38.7 | 9.4/30 | 8.5/30 | — | 9.5/30 | 25/30 | 31/1.4 | — |
| 20 | Atlas II | 0 | 1.3 | >50/0.2 | — | — | — | — | — | — |
| 21 | do | 0.2 | — | 35/0.4 | — | — | — | — | — | — |
| 22 | do | 0.3 | — | 18/30 | 28/0.4 | — | — | — | — | — |
| 23 | do | 0.4 | — | 19.5/22 | 26/2.6 | — | — | — | — | — |
| 24 | do | 0.5 | — | 13/30 | 11/30 | — | — | — | — | — |
| 25 | Unaflo | 0 | 9.1 | high | — | — | — | — | — | — |
| 26 | do | 0.1 | — | 18/0.1 | — | — | — | — | — | — |
| 27 | do | 0.2 | — | 17/15 | 25/0.5 | — | — | — | — | — |
| 28 | do | 0.3 | — | 13.5/30 | 21/2.8 | — | — | — | — | — |
| 29 | do | 0.4 | — | 9/30 | 10.5/30 | 12.5/30 | — | — | — | — |
| 30 | do | 0.5 | 170+ | 7.7/30 | 9.5/30 | 9.5/30 | 8.2/30 | 11/30 | 10.5/30 | — |
| 31 | Inferno | 0 | 7.7 | high | — | — | — | — | — | — |
| 32 | do | 0.3 | — | 18/30 | 22/0.3 | — | — | — | — | — |
| 33 | do | 0.4 | — | 10/30 | 22/14 | 21/1.8 | — | — | — | — |
| 34 | do | 0.5 | 11.3 | 8/30 | 9.5/30 | 10/30 | 8.2/30 | 9.5/30 | 9.0/30 | — |
| 35 | Starcor #2 | 0 | 4.4 | high | — | — | — | — | — | — |
| 36 | do | 0.5 | 38.2 | 9.1/30 | 10.5/30 | 12.3/30 | 12.5/30 | 11/30 | 11/30 | 11/30 |
| 37 | Starcor #3 | 0 | 5.5 | high | — | — | — | — | — | — |
| 38 | do | 0.1 | 17.9 | 22/0.2 | — | — | — | — | — | — |
| 39 | do | 0.2 | 103.2 | 24/0.3 | — | — | — | — | — | — |
| 40 | do | 0.3 | 170+ | 17.5/30 | 22/1.4 | — | — | — | — | — |
| 41 | do | 0.4 | — | 14/30 | 16/30 | 21/30 | — | — | — | — |
| 42 | Portland | 1.0 | >30 | 3.2/30 | 3.5/30 | 3.2/30 | 7/30 | 10/30 | — | — |
| 43 | 15%[3] $Na_2SO_4$ | 1.0 | — | 3.4/30 | 4.2/30 | — | — | — | — | — |
| 44 | 8% $Na_2SO_4$ | 0.5 | 21.4 | 26/30 | 26/30 | 27/30 | 35/30 | 30/21 | 34/9.0 | — |
| 45 | 2% $Na_2SO_4$ | 0.5 | 22.4 | 19.5/30 | 17/30 | 22/30 | 37/5.6 | — | — | — |
| 46 | 1.6% $Na_2SO_4$ | 0.5 | 23.2 | 16.5/30 | 18.5/30 | 14/30 | 14/30 | 25/30 | 31/4.4 | — |

[1] The dash lines "—" above represent items not tested due to lack of time.
[2] "Portland" is ordinary Portland cement, "Atlas II," "Unaflow," "Inferno," "Starcor #2 and #3" and "Sulfate +" are modified Portland cements as follows:
"Atlas II" is a trade name for a modified Portland cement which is sulfate resistant and is high in dicalcium silicate and tetracalcium aluminoferrite and low in tricalcium aluminate.
"Unaflow," "Inferno," "Starcor #2," and "Starcor #3" are the trade names of slow setting modified Portland cements. "Unaflow" and "Inferno" may contain a wax, gum, starch, lignin sulfonate, or some other carbohydrate. The "Starcor" cements may use a minimum of tricalcium aluminate. It is really not possible to find out what is in these trade name cements and the above statements as to their possible contents are mere speculation.
"Sulfate +" is Portland cement plus 15% $Na_2SO_4$ by weight of dry cement. In tests 36 and 42 there was much less than 2% $Na_2SO_4$, in tests 44, 45 and 46 there was 8%, 2%, and 1.6% $Na_2SO_4$. All tests 42 to 46 were on Portland cement slurry.
[3] Tests Nos. 43 to 46 were with the same aqueous Portland cement slurry as test 42 but with the percentage of sodium sulfate indicated added to determine if it would injure the thickening time and/or water-loss of said slurry.

the spring, which is measured and recorded by an electrical system, is a measure of the consistency of the slurry.

The temperature of the system is controlled by the manual adjustment of a powerstat which controls a heater in the oil bath surrounding the cement cup. Two thermocouples, one in the oil bath and one in the cement cup, indicate the temperatures outside and inside the cement.

All of these mechanisms are located in a pressure chamber which can be filled with oil and sealed. The high pressures are then obtained by forcing more oil into the chamber with a piston which is driven by another piston on the same shaft which is in turn driven by air pressure. The ratio of the area of the air piston to that of the oil piston is about 200 to 1, so that about 20,000 p. s. i. pressure can be created in the oil chamber by 100 p. s. i. air pressure.

The procedures for filling the cement cup, inserting the mechanisms, expelling the air and so forth, are rather lengthy and will not be described here. Said API Code 32 contains a series of schedules for various well depths which indicate the rate at which the temperature and pressure are increased and the final temperature and pressure. This is done to simulate conditions during the pumping and placing the cement slurry.

EXAMPLE IV

Sodium cellulose sulfate seems to make ordinary Portland cement resist soluble inorganic sulfates, such as sodium sulfate, as shown by test 43 in Table IV above.

EXAMPLE V

As a final test before using the invention in a well the temperature and pressures were increased in the tests in Table V which was conducted in the Super Pressure Consistometer.

*Table V*

| Test No. | Percent Additive | "Depth" (simulated), feet | Pressure (p. s. i.) | Temperature, °F. | Thickening Time (hours) |
|---|---|---|---|---|---|
| 47 | 0 | 4,000 | 2,575 | 103 | 2.6 |
| 48 | 0 | 8,000 | 5,150 | 125 | 1.3 |
| 49 | 0.5 | 12,000 | 10,225 | 172 | 5.0 |
| 50 | 0.3 | 12,000 | 10,225 | 172 | 2.4 |
| 51 | 0.3 | 10,000 | 7,484 | 144 | 3.1 |

In Table V above, 40% water by weight of dry cement was used. The cement was Portland cement. The additive was sodium cellulose sulfate in the per cent by weight of the dry cement listed. The 'depth" was simulated by the pressure and temperature listed.

EXAMPLE VI

A well was selected which was drilling at about 10,000 feet and in which it was desirable to cement a 9,550 foot string of casing. It was predicted that the hydrostatic pressure at the point of cementing would be 9,000 pounds per square inch and that the temperature there would be 224° F. It was believed desirable that the thickening time should be more than six hours. The string of casing was assembled and lowered into place in the bore of the well.

1750 sacks of Portland cement were thoroughly admixed with 0.47% by weight of the dry cement of sodium cellulose sulfate, the mixture was pumped into the top of the casing, through the same, out the bottom of the same, and up between the casing and the wall of the well, and a conventional casing cementing job was accomplished, cementing 9,550 feet of casing in the well. This well cementing job was successful due to the use of the sodium cellulose sulfate, because if a straight Portland cement aqueous slurry had been used, it would have set in the well before it reached the bottom of the casing, and it would never have come up around the outside of the casing to cement the same in place.

This successful casing cementing job in a deep well was an especially favorable demonstration of the invention, because while the time of set of the cement was extended beyond the time necessary to cement by a greater margin than necessary, due to the temperature and pressure being only 172° F. and 6,600 pounds per square inch respectively at the point of cementing, instead of 224° F. and 9,000 p. s. i. respectively as predicted, the well casing was nevertheless successfully cemented, which could not have been done with straight Portland cement aqueous slurry.

Well simulation thickening times at 224° F. and 9,000 p. s. i. were tested on eight samples of said cement mixture being used in said well, said samples being taken at spaced intervals of time at the hopper while cementing the 9,550 foot casing. The thickening times of said eight samples varied from 6 hours 34 minutes to 7 hours 46 minutes, with an average value of 7 hours 13 minutes, which indicated that the cellulose sulfate was adequately blended in the cement. Laboratory tests showed that this variation in thickening times could be accounted for by variation in admix concentration of from 0.44 to 0.49 percent. One well simulation thickening time was run at the actual temperature and pressure in the well of 172° F. and 6,600 pounds per square inch and this sample took 32 hours to reach initial set and between 42 and 72 hours to reach final set in the tester. The compressive strength of this last mentioned sample from the tester was 3190 pounds per square inch, which was considered excellent.

This full scale field test in an actual well shows that acid cellulose sulfate and its salts may safely be employed in hydraulic cement aqueous slurries for cementing wells after making a minimum number of the conventional cement setting tests which are always done in preparation for any well cementing job, and that even if the conditions actually present in the well vary widely from the conditions predicted, that acid cellulose sulfate or its salts will still be operative for the purposes desired.

While numerous examples of the invention have been given for purposes of illustration, the invention is not limited thereto.

Having described my invention, I claim:

1. A cement capable of forming a fluid slurry when mixed with water, said cement having an extended thickening time, said cement comprising a hydraulic cement mixed with 0.05% to 5% by weight of the dry cement of a hydraulic cement thickening time extending agent selected from the group consisting of acid cellulose sulfate and salts of acid cellulose sulfate.

2. The process of cementing a hole which extends into a formation which comprises placing a hydraulic cement aqueous slurry having an extended thickening time adjacent to said formation by admixing with hydraulic cement from 0.05% to 5% by weight of the dry cement of alkali metal cellulose sulfate, mixing therewith sufficient water to produce a fluid slurry and introducing said slurry into said hole into contact with said formation.

3. A cement capable of forming a fluid slurry when mixed with water, said cement having an extended thickening time, said cement comprising Portland cement mixed with 0.05 to 5% by weight of the dry cement of alkali metal cellulose sulfate.

4. A hydraulic cement slurry having an extended thickening time comprising a hydraulic cement, water, and from 0.05 to 5% by weight of the dry cement of a hydraulic cement thickening time extending agent selected from the group consisting of acid cellulose sulfate and salts of acid cellulose sulfate.

5. A hydraulic cement slurry having an extended thickening time, comprising Portland cement, water, and from 0.05 to 5% by weight of the dry cement of alkali metal cellulose sulfate.

6. A hydraulic cement slurry having an extended thickening time, comprising Portland cement, water, and from 0.05 to 5% by weight of the dry cement of sodium cellulose sulfate.

7. In the method of cementing a casing in a well which comprises pumping down through the casing and upwardly in the annular space between the casing and the borehole an aqueous hydraulic cement slurry, the step of adding to the cement slurry a hydraulic cement thickening time extending agent selected from the group consisting of acid cellulose sulfate and salts of acid cellulose sulfate in amounts ranging between 0.05 and 5% by weight of the dry cement in the slurry.

8. In the method of cementing a casing in a well which comprises pumping down through the casing and upwardly in the annular space between the casing and the borehole an aqueous Portland cement slurry, the step of adding to the cement slurry alkali metal cellulose sulfate in amounts ranging between 0.05 and 5% by weight of the dry cement in the slurry.

9. The process of producing a hydraulic cement aqueous slurry having an extended thickening time which comprises admixing with hydraulic cement from 0.05% to 5% by weight of the dry cement of a hydraulic cement thickening time extending agent selected from the group consisting of acid cellulose sulfate and salts of acid cellulose sulfate, and mixing therewith only sufficient water to produce a pumpable fluid slurry.

10. The process of producing a Portland cement aqueous slurry having an extended thickening time which comprises admixing with Portland cement from 0.05 to 5% by weight of the dry cement of alkali metal cellulose sulfate and mixing therewith only sufficient water to produce a pumpable fluid slurry.

11. The process of cementing a well which extends into a pervious formation which comprises placing a Portland cement aqueous slurry having a reduced water-loss adjacent to said pervious formation by admixing with Portland cement from 0.05 to 5% by weight of the dry cement of a Portland cement slurry water-loss reducing agent selected from the group consisting of said cellulose sulfate and salts of acid cellulose sulfate, mixing therewith sufficient water to produce a fluid slurry, and introducing said slurry into said well into contact with said pervious formation.

References Cited in the file of this patent

UNITED STATES PATENTS

| | | |
|---|---|---|
| 2,278,455 | Linzell et al. | Apr. 7, 1942 |
| 2,425,768 | Wagner | Aug. 19, 1947 |
| 2,425,891 | McMullen | Aug. 19, 1947 |
| 2,427,683 | Ludwig | Sept. 23, 1947 |
| 2,468,792 | Wagner | May 3, 1949 |
| 2,471,632 | Ludwig | May 31, 1949 |
| 2,514,021 | Abraham | July 4, 1950 |
| 2,556,222 | Scarth | June 12, 1951 |
| 2,560,611 | Wagner | July 17, 1951 |
| 2,570,947 | Himmel et al. | Oct. 9, 1951 |
| 2,580,565 | Ludwig | Jan. 1, 1952 |
| 2,583,657 | Lea et al. | Jan. 29, 1952 |
| 2,629,667 | Kaveler | Feb. 24, 1953 |